United States Patent
Box, Jr. et al.

[15] 3,674,706
[45] July 4, 1972

[54] TIN IMPREGNATION REGENERATION OF GROUP VIII REFORMING-DEHYDROGENATION CATALYSTS

[72] Inventors: E. O. Box, Jr.; Lewis E. Drehman; Floyd E. Farha, Jr., all of Bartlesville, Okla.

[73] Assignee: Phillips Petroleum Company

[22] Filed: June 3, 1970

[21] Appl. No.: 43,202

[52] U.S. Cl. ............................252/412, 208/140, 252/411, 252/413, 252/414, 252/416, 260/683.3
[51] Int. Cl. ..................................B01j 11/18, B01j 11/02
[58] Field of Search ..................252/411–414, 420; 260/683.3

[56] References Cited

UNITED STATES PATENTS

| | | | |
|---|---|---|---|
| 3,558,514 | 1/1971 | Schutt | 252/412 |
| 2,439,852 | 4/1948 | Jackson | 252/413 |
| 2,330,174 | 9/1943 | Hachmuth | 252/412 |
| 3,140,263 | 7/1964 | Payne | 252/412 |
| 3,531,543 | 9/1970 | Clippinger et al. | 252/466 PT |
| 3,511,888 | 2/1968 | Jenkins | 260/683.3 |
| 3,461,177 | 8/1969 | Box, Jr. et al. | 260/683.3 |
| 3,461,183 | 8/1969 | Hepp et al. | 260/683.3 |

Primary Examiner—Daniel E. Wyman
Assistant Examiner—P. E. Konopka
Attorney—Young and Quigg

[57] ABSTRACT

Deactivated catalysts containing Group VIII metal contact agents are regenerated by a process comprising impregnating the deactivated composite material with tin or a tin compound. Preferably, the tin-impregnated composite is thereafter calcined. The process is particularly suitable for the regeneration of deactivated reforming and dehydrogenation catalysts.

7 Claims, No Drawings

TIN IMPREGNATION REGENERATION OF GROUP VIII REFORMING-DEHYDROGENATION CATALYSTS

This invention relates to chemical processes. Particularly, the invention relates to catalytic processes and to the regeneration of deactivated catalytic composites, especially such composites containing a Group VIII metal compound so as to restore them to a high level of activity for catalytic reforming and/or dehydrogenation processes.

Catalytic composites containing Group VIII metal compounds, generally in combination or association with a carrier or support material, are known to be useful in conversion reactions such as reforming and dehydrogenation processes. While such catalysts are characterized by a high initial activity and selectivity for the desired reaction and product, the activity and selectivity can often fall off quite rapidly due to deactivation such as from coke laydown. While the activity of these catalysts can be restored at least in part by treatments such as oxidation to burn off carbonaceous deposits, often the activity of the regenerated catalyst is not restored to original levels. Ultimately, it is necessary to replace the catalyst because of the failure of conventional regeneration techniques to restore the catalyst activity and selectivity to commercially acceptable levels.

It has now been discovered that the usual life of catalytic composites containing a Group VIII metal compound, before complete replacement of such catalyst is required, can be substantially extended and that such inactivated, i.e., spent, catalyst composites can be effectively reactivated to an activity commensurate with that of fresh catalyst by contacting the spent catalyst with tin or a solution of a tin compound to impregnate into the catalyst from 0.01–2.0 weight percent of additional tin. A feature of this invention is that activity may be restored even after dropping to commercially unacceptable values.

The catalyst composites which are reactivated according to the process of this invention comprise supported Group VIII metal compounds selected from the group consisting of nickel, platinum, ruthenium, rhodium, palladium, osmium, iridium and mixtures thereof. These Group VIII metal compounds are preferably employed in combination with a support selected from the group consisting of alumina, HF-treated alumina, flame-hydrolyzed alumina, silica, magnesia, zirconia, alumino silicates, Group II aluminate spinels, and mixtures thereof. As support materials, the Group II aluminate spinels are preferred with zinc aluminate spinel being particularly preferred. The Group VIII metals can include activating components such as Group IA and IIA alkali metal and alkaline earth compounds as well as tin, germanium and lead. Preferred composites include the catalytic materials disclosed in U.S. Pat. Nos. 3,168,587 and 3,461,183, and such of these catalytic materials which have been further modified by the incorporation of a tin compound into the support prior to calcination thereof or by the combination of the Group VIII metal or metal compound and tin, germanium or lead compounds.

The inactivated or spent catalyst may be impregnated with tin or a tin compound in any manner known to the art, such as by vaporization of the tin or tin compound in the presence of the spent catalyst composite. Preferably, impregnation is accomplished from solution. Any solvent can be employed in which the tin compound will dissolve in an appreciable amount and which does not interfere with the reactivating effect of the tin. In addition, the selected solvent is one which is substantially inert to the substrate and is not a solvent for the substrate. Water is a preferred solvent although nonaqueous solvents such as alcohols, phenols, ammonia, carbon disulfide, hydrocarbons, ketones, aldehydes, carboxylic acids, esters and the like, including mixtures thereof, can be used if desired. Generally, the selected solvent has a relatively low boiling point to facilitate removal by volatilization of the solvent from the treated catalyst without substantial volatilization and loss of the tin. Generally, solvents having a boiling point of about $-50°$ to $200°$ C. are preferred.

In accordance with the invention, the catalyst to be regenerated can be subjected to treatment such as an oxidation or burning operation to remove carbonaceous matter such as coke deposits from the surface of the catalyst. Such treatment is usually conducted at a temperature range known to the art for such purposes, and generally is in the order of $300°–1200°$ F. The catalyst can be in any suitable particle size and can be in a preformed shape such as pellets, pills, granules, spheres, and the like.

The treatment of the spent catalyst with tin solution can be effected in any suitable manner, which may be either a batch type of operation or a continuous type of operation. In a batch type of operation, the catalyst composite may be disposed in a zone and the tin solution poured over the composite or the zone may be partially filled with tin solution and the spent catalyst then introduced thereto. In another embodiment, the catalyst may be disposed in a confined zone and the tin solution passed through the catalyst-containing zone.

In general, the tin compounds which can be used in the practice of this invention are those compounds which are converted to tin metal or tin oxide upon heating and/or oxidation of the tin-treated catalyst composite. Such tin compounds must not contain silicon and preferably will not contain any metal other than tin or an alkali metal. Suitable tin compounds include both stannic and stannous forms of tin such as stannic ammonium chloride, stannic bromide, stannic chloride, stannic fluoride, stannic iodide, stannic nitrate, stannic sulfide, stannic oxychloride, stannic acetate, stannic propionate, stannic tartrate, and the like; the corresponding stannous compounds; triphenyltin chloride, diethyltin, triethyltin, and the like; and mixtures thereof.

Any suitable concentration of tin compound can be used for the impregnating solutions to impregnate the catalyst composite with 0.01 to 2 weight percent tin. Preferably, the composite is impregnated with 0.1 to 1 weight percent tin. Saturated solutions are preferred. Repeated impregnations can be effected to impregnate the catalyst composite with the desired amount of tin.

Generally, impregnating conditions will vary with the tin compound and solvent. In solution impregnation, conditions are such as to maintain the solution in the liquid state. Preferably, the impregnations are effected at atmospheric pressures and ambient temperatures. Contact time will vary and will generally be in the range of about 5 minutes to about 4 hours, preferably 5 minutes to about 2 hours and, in any event, will be sufficient to insure impregnation of the composite with the desired amount of tin.

Following impregnation, the tin-treated composite can be dried at temperatures in the range of $100°$ to about $400°$ F. and/or, preferably, calcined at temperatures of $800°$ to $1,200°$ F. or higher.

The following examples illustrate the invention.

In each of Examples 1–4, n-butane was dehydrogenated over the specified catalytic material at the following conditions: $1,040°–1045°$ F., 85 psig, 1,200 n-butane space velocity (GHSV: volumes n-butane/volume catalyst/-hour), and a steam:n-butane molar ratio of 5:1; in a cyclic, continuous flow process with intermediate air regeneration. Each cycle consists of a regeneration step of 30 minutes effected at process conditions including 5 minutes of nitrogen flush, 20 minutes of air treatment, and 5 minutes of nitrogen flush with a constant steam injection rate during the regeneration step; followed by the conversion (dehydrogenation) step of 7.5 hours at the recited conditions. Each cycle, including initial cycles with any catalyst, is operated with a regeneration and conversion step.

In all examples which follow, the percent conversion is determined by gas-liquid chromatography with the analysis being made of the reactor effluent at the times indicated, with reference to on-stream hours of conversion cycle.

EXAMPLE 1

A fresh catalyst comprising 0.38 percent by weight platinum in association with 0.23 percent by weight tin supported by zinc aluminate spinel is prepared as follows:

A slurry comprising 3-¾ pounds of flame-hydrolyzed alumina and 3-3/16 pounds of reagent grade zinc oxide powder in 9 liters of distilled water was ball milled for one hour and dried overnight at 200°–220° F. The resulting dry cake was crushed, sieved, compounded with 8 weight percent of a polyethylene lubricant and pelleted into ⅛-inch pellets. The tablets were calcined in a muffle furnace according to the following program: 2 hours at 800° F., 2 hours at 1,100° F., and 3 hours at 1,150° F. The calcined pellets were crushed and sieved into 10–20 mesh and 20–40 mesh portions of zinc aluminate spinel support.

An aqueous solution containing 2.845 grams stannous chloride dissolved in 16 cubic centimeters concentrated hydrochloric acid and 84 cubic centimeters distilled water in admixture with 361 cubic centimeters of chloroplatinic acid solution containing 0.01308 gram platinum per cubic centimeter was diluted with water to make 850 cubic centimeters of impregnating solution. This solution was poured over 1,237.1 grams of the prepared 10–20 mesh zinc aluminate spinel and allowed to soak 10 minutes before drying under heat lamps. The dried catalyst was calcined in air for 3 hours at 1,050° F.

The thus-prepared catalyst comprising 0.38 weight percent platinum and 0.23 weight percent tin is placed into service in the dehydrogenation of n-butane according to the heretofore described operating conditions with the following results:

| Cycle | 1 | | 3 | |
|---|---|---|---|---|
| Hours into conversion part of cycle | 0.5 | | 0.5 | 7.3 |
| Conversion, percent | 43.1 | | 42.9 | 40.0 |

After 205 hours on-stream, the conversion activity of the catalyst had declined to 13.7 percent after air regeneration. The spent catalyst was divided into several portions for use as the catalyst composite of Examples 2 through 4.

EXAMPLE 2

Separate portions of the spent catalyst of Example 1 were treated by impregnation with additional platinum and by heating with hydrogen at a temperature of 1,050° F., respectively, with no significant increase in conversion activity over that shown by the spent catalyst.

EXAMPLE 3

A portion of the spent catalyst of Example 1 was continued in service with no additional treatment other than air regeneration according to the process cycle program with the following results:

| Cycle | 1 | | 2 | |
|---|---|---|---|---|
| Hours into conversion part of cycle | 6.5 | 7.0 | 0.5 | 7.3 |
| Conversion, percent | 13.7 | 8.6 | 9.0 | 6.1 |

EXAMPLE 4

Separate portions of the spent catalyst of Example 1 were treated according to the invention by immersing the portions in aqueous solutions of stannous chloride to impregnate the portions with sufficient stannous chloride to provide composites containing 0.2, 0.4 and 0.8 weight percent additional tin, respectively. After drying, the stannous chloride-impregnated composites were calcined in air for 3 hours at 1,050° F. The catalyst composites treated according to the invention were placed into service in the dehydrogenation of n-butane according to the heretofore described operating conditions with the following results:

| Cycle | 1 | | 2 | |
|---|---|---|---|---|
| Hours into conversion part of cycle | 0.5 | 7.0 | 0.5 | 7.3 |
| Conversion, percent: Tin-treated Composite weight percent Tin Impregnated | | | | |
| 0.2 | 16.9 | 14.4 | 31.0 | 18.6 |
| 0.4 | 32.6 | 24.4 | 35.3 | 24.6 |
| 0.8 | 26.5 | 17.3 | 22.7 | 16.2 |

The data of Examples 1–4 demonstrate the effect of the reactivation process of the invention on extending the life of Group VIII metal compound-containing catalysts.

EXAMPLE 5

A fresh catalyst was prepared following the procedure of Example 1 except that 40 grams of reagent grade stannic oxide was added to the slurry containing flame-hydrolyzed alumina and zinc oxide to provide a finished zinc aluminate spinel-tin support material containing 1 percent tin.

The thus-prepared support material was impregnated with 0.4 weight percent platinum by soaking 1,200 grams of the prepared 10–20 mesh zinc aluminate spinel-tin support in 337 cubic centimeters of chloroplatinic acid containing 0.0145 gram platinum per cubic centimeter. The catalyst was placed into service for the dehydrogenation of n-butane at 1,050° F., 90 psig, a space velocity of 1250 GHSV n-butane and steam:n-butane molar ratio of 6:1; using the process cycle of Examples 1–4 with the following results:

| Cycle | 109 | 397 |
|---|---|---|
| Hours on stream | 859 | 3282 |
| Conversion, percent | 43.0 | 30.5 |

The catalyst was continued in service until its activity had declined to about 16.5 percent after air regeneration. The spent catalyst was divided into several portions to provide the catalyst composite of Examples 6 and 7.

EXAMPLE 6

A portion of the spent catalyst of Example 5 was continued in service with no additional treatment other than air regeneration according to the process cycle with the following results:

| Hours on stream from start of first conversion | 0.5 | 22.0 |
|---|---|---|
| Conversion, percent | 16.5 | 14.4 |

EXAMPLE 7

A portion of the spent catalyst of Example 5 was treated according to the invention by immersion in an aqueous solution of stannous chloride to provide a composite containing 0.4 weight percent additional tin. The thus-treated spent catalyst composite was dried under a heat lamp and returned to service without additional calcination with the following results:

| Hours on stream from start of first conversion | 2.0 | 19.5 |
|---|---|---|
| Conversion, percent | 32.9 | 25.4 |

Examples 5–7 further demonstrate the effect of the reactivation process of the invention on extending the life of Group VIII metal compound-containing catalysts, and the importance of impregnating the spent composite according to the invention.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A method of reactivating a reforming and dehydrogenation catalyst composite comprising a Group II aluminate spinel supported Group VIII metal compound and tin compound which consists essentially of oxidizing said catalyst composite to remove carbonaceous matter, contacting said catalyst composite with a solution of tin compound to impregnate said composite with from 0.01 to 2 weight percent tin, based on weight of composite, and subjecting said thus tin impregnated composite to a treatment of drying, calcining, or both drying and calcining.

2. A method according to claim 1 wherein said Group VIII metal compound is selected from the group consisting of nickel, platinum, ruthenium, rhodium, palladium, osmium, iridium, and mixtures thereof.

3. A method according to claim 2 wherein said support is zinc aluminate spinel.

4. A method according to claim 2 wherein said tin solution is an aqueous or nonaqueous solution of a tin compound selected from the class consisting of stannous or stannic halide, nitrate, sulfide, ammonium halide, oxy-halide, acetate, propionate, tartrate, triphenyltin chloride, diethyltin and triethyltin.

5. A method according to claim 4 wherein said catalyst composite is impregnated with from 0.1 to 1 weight percent tin.

6. A method according to claim 5 wherein said support is zinc aluminate spinel and said Group VIII metal is platinum.

7. A method according to claim 1 wherein said tin-impregnated composite is calcined at a temperature in the range of 800° to 1,200° F.

* * * * *